United States Patent
Lee et al.

(10) Patent No.: US 12,405,837 B2
(45) Date of Patent: Sep. 2, 2025

(54) METHOD AND SYSTEM FOR ACCELERATION OR OFFLOADING UTILIZING A UNIFIED DATA POINTER

(71) Applicants: Lemon Inc., Grand Cayman (KY); Beijing Volcano Engine Technology Co., Ltd., Beijing (CN)

(72) Inventors: Chul Lee, Los Angeles, CA (US); Hui Zhang, Los Angeles, CA (US); Shan Xiao, Beijing (CN); Bo Li, Beijing (CN); Ping Zhou, Los Angeles, CA (US); Fei Liu, Los Angeles, CA (US)

( * ) Notice: Subject to any disclaimer, the term of this patent is extended or adjusted under 35 U.S.C. 154(b) by 23 days.

(21) Appl. No.: 18/485,418

(22) Filed: Oct. 12, 2023

(65) Prior Publication Data

US 2024/0036940 A1 Feb. 1, 2024

(51) Int. Cl.
*G06F 9/50* (2006.01)

(52) U.S. Cl.
CPC .......... *G06F 9/5083* (2013.01); *G06F 9/5027* (2013.01); *G06F 2209/509* (2013.01)

(58) Field of Classification Search
None
See application file for complete search history.

(56) References Cited

U.S. PATENT DOCUMENTS

2022/0114270 A1* 4/2022 Wang .................... G06F 9/5027

* cited by examiner

*Primary Examiner* — Scott C Sun
(74) *Attorney, Agent, or Firm* — Fish & Richardson P.C.

(57) ABSTRACT

Methods, systems, and devices for performing an acceleration process by offloading an operation. The system includes a hardware offloading engine that includes a hardware accelerator for performing the acceleration process. The hardware accelerator has a processor configured to receive a hardware offloading command, the hardware offloading command including an operation code, an input pointer, and an output pointer, in which at least one of the input pointer or the output pointer includes a unified data pointer that includes one or more bits of memory for identifying the source location for the input data or the destination location of the output data, parse the operation code, the input pointer, and the output pointer from the hardware offloading command, retrieve the input data based on the input pointer, and execute an offloaded operation on the input data based on the operation code.

18 Claims, 6 Drawing Sheets

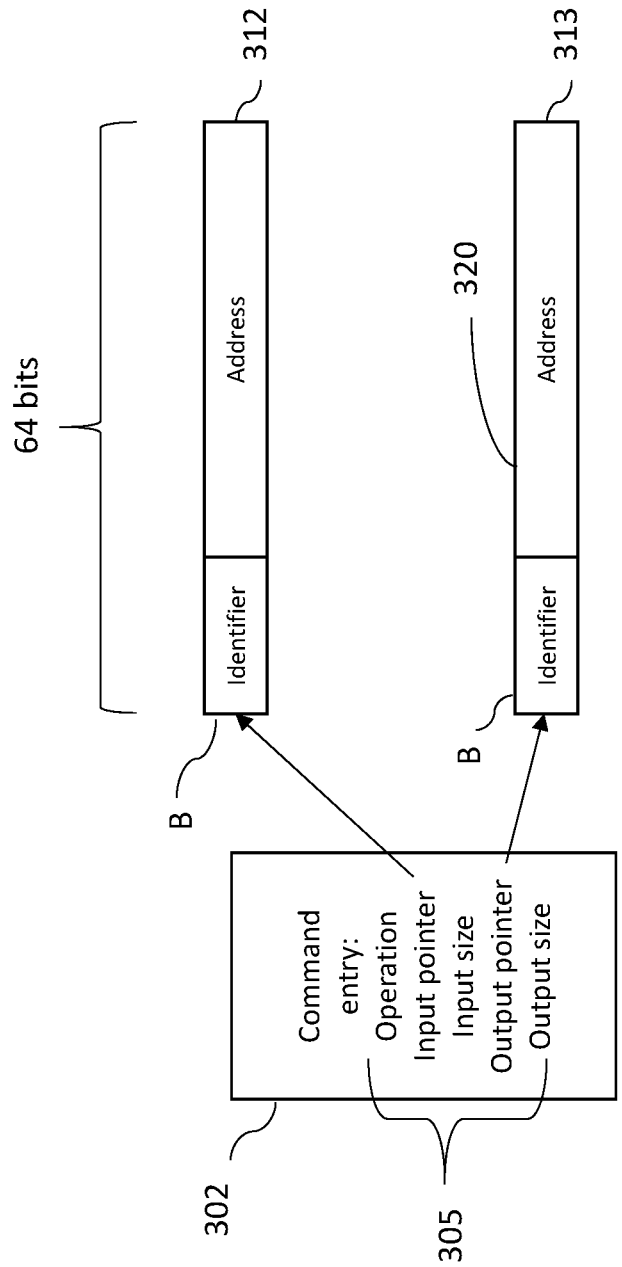
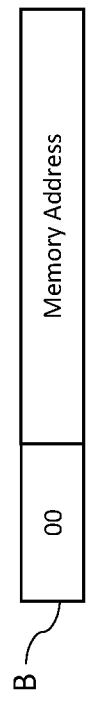
FIG. 3A
FIG. 3B
FIG. 3C
FIG. 3D

METHOD AND SYSTEM FOR ACCELERATION OR OFFLOADING UTILIZING A UNIFIED DATA POINTER

FIELD

The embodiments described herein pertain generally to non-volatile storage systems. More specifically, the embodiments described herein pertain to methods and systems for acceleration or offloading operations for non-volatile storage systems, for example, cloud computing services, in which offloading commands for hardware offloading operations include a unified data pointer.

BACKGROUND

Non-volatile storage, e.g., block-level storage, is a common form of storage that is used to store data on storage area networks, e.g., servers, in cloud-based storage environments, at a data center, etc. Cloud-based storage or storage device is a common product offered by cloud service providers (CSPs). In cloud-based storage or storage devices, data acceleration may be used by offloading operations from a host controller to the non-volatile storage system hardware, e.g., to the controllers having hardware, software, and/or firmware in communication with the non-volatile storage, for example, on the server or connected via a peripheral component interconnect express (PCIe) card.

SUMMARY

Methods, systems, and devices are described herein directed to optimizing non-volatile storage systems that use hardware offloading or hardware acceleration by utilizing a unified data pointer in the offloading command for the hardware acceleration and/or hardware offloading operations, for example, in heterogeneous storage and storage device systems having at least two types of data locations. The unified data pointer may be used to point to the specific memory location(s) from where the data is sourced, e.g., read, or where the data needs to be stored, e.g., written. That is, the methods, systems, and devices are designed, programmed, or otherwise configured to prepare and/or parse an offloading command that includes a data field for using a unified data pointer to identify a source of input data and/or a destination of output data, such that a single command may be used to represent all types of different data transfers/directions, e.g., different storage/memory locations for reading/writing data, e.g., Table 1 and/or from the various devices in a heterogeneous storage and storage device system.

In an embodiment, a hardware offloading engine for performing an acceleration process is provided. The hardware offloading engine includes a hardware accelerator for performing the acceleration process, the hardware accelerator having a processor configured to receive a hardware offloading command. The hardware offloading command includes an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location for the input data or the destination location of the output data. The hardware accelerator is further configured to parse the operation code, the input pointer, and the output pointer from the hardware offloading command, retrieve the input data based on the input pointer, and execute an offloaded operation on the input data based on the operation code.

In another embodiment, a non-volatile storage device is provided. The non-volatile storage device includes a non-volatile storage and a controller. The controller includes a hardware offloading engine for performing an acceleration process. The hardware offloading engine includes a first interface for communicating with a host device; a second interface for communicating with the non-volatile storage; and a hardware accelerator for performing the acceleration process. The hardware accelerator has a processor configured to receive from the interface a hardware offloading command from the host device, the hardware offloading command comprising an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location for the input data or the destination location of the output data, parse the operation code, the input pointer, the input data size, the output pointer, and the output data size from the hardware offloading command, retrieve input data based on the input pointer and the input data size, and execute an offloaded operation on the input data based on the operation code.

In yet another embodiment, a hardware offloading engine for performing an acceleration process is provided. The hardware offloading engine includes a hardware accelerator for performing the acceleration process, the hardware accelerator having a processor configured to receive a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data, and execute an offloaded operation on the input data based on the operation code.

In still yet another embodiment, a method for performing an acceleration process by offloading an operation to a hardware offloading engine is provided. The method includes receiving a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data, parsing the operation code, the input pointer, and the output pointer from the hardware offloading command, retrieving the input data based on the input pointer, and executing an offloaded operation on the hardware offloading engine on the input data based on the operation code.

In an embodiment, a host device configured to be in communication with a non-volatile storage device is provided. The host device includes a non-transitory computer readable medium having computer-executable instructions stored thereon that, upon execution, cause one or more processors to perform operations including preparing a hardware offloading command by providing an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location of the input data or the destination location of the output data, sending the hardware offloading command, and receiving a completion command.

In another embodiment, a non-transitory computer-readable medium having computer-executable instructions stored thereon is provided. The non-transitory computer-readable medium have the computer-executable instructions, which upon execution, cause one or more processors to perform operations including: receiving a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data, parsing the operation code, the input pointer, and the output pointer from the hardware offloading command, retrieving the input data based on the input pointer, and executing an offloaded operation on the hardware offloading engine on the input data based on the operation code.

As such, in the embodiments disclosed herein, performance in non-volatile storage systems may be optimized by minimizing the number of commands necessary for accessing various memory or storage locations for reading and/or writing data from one or more different data directions, e.g., locations, by using a unified indexing mechanism to identify the one or more different data directions. As such, in an embodiment, by using an operation code that includes the unified indexing mechanism, e.g., a unified data pointer, any data transfer, e.g., from a host-side memory, a device-side memory, and/or a device-side storage block, may be described without the need for introducing new commands, e.g., for the data used for the offloaded hardware acceleration operation.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

FIGS. 3A, 3B, 3C, 3D are representations of an example offloading command, arranged in accordance with at least some embodiments described herein.

DETAILED DESCRIPTION

Figure 1:
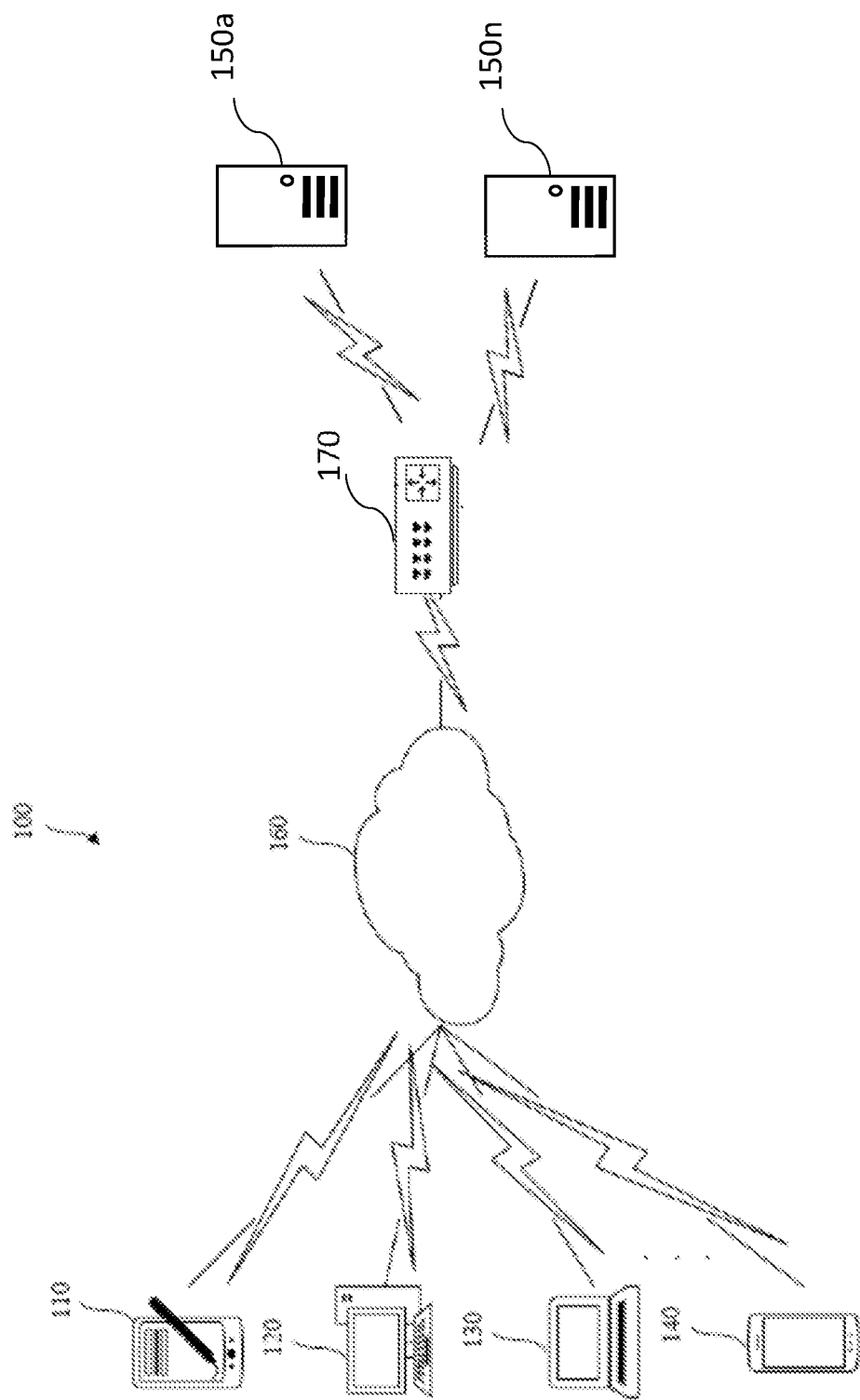
FIG. 1 is a schematic view of an example cloud-based storage system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "network" or a "computer network system" is a term of art and may refer to interconnected computing devices that may exchange data and share resources with each other. It is to be understood that the networked devices may use a system of rules (e.g., communications protocols, etc.), to transmit information over wired and/or wireless technologies.

As referenced herein, a "NVMe protocol or interface" may refer to non-volatile memory express protocol that provides a quick interface between computer processing units and storage devices, such as solid-state devices (SSDs). The NVMe protocol or interface may use a Peripheral Component Interconnect Express (PCIe) bus that provides a leaner interface for accessing the SSDs.

As referenced herein, "unified memory" may refer to a single memory address space accessible by any processor in a system, e.g., shareable by host device and hardware offloading engine. The unified memory may be stored/shared on various storage mediums, such as, dynamic random-access memory (DRAM), flash drives, high bandwidth memory (HBM), different memory spaces, shared memory spaces, memory on the network card, or the like, e.g., addressable memory space.

As referenced herein, a "module" may refer to a network, algorithm, programs, software, hardware, or any combination thereof configured or otherwise provided to perform the recited function.

In some computer networking systems, such as, cloud-based storage environments, e.g., in a data center, that use heterogeneous storage and storage devices, e.g., that uses different types of storage media, such as, hard disk drives, solid-state devices, tape drives, or the like for data storage, hardware offloading operations may be provided such that a host device having a controller, such as, a central processing unit (CPU), may offload certain functionalities or operations from the host device to a controller (or CPU) on a server connected to the storage device(s), e.g., due to CPU limitations on the host device and/or optimization of the same. For example, in some embodiments, the processor-enabled server, e.g., having hardware, software, and/or firmware operations, may include various hardware offloading engines and/or accelerators, such as data streaming accelerators, graphics processing units, in-memory analytics accelerators, or the like for performing certain functionalities or operations that may otherwise be run on the CPU. In some embodiments, the host device may receive a request to support big data analytics, such as, collecting, scrubbing, analyzing, and/or processing one or more data streams and the host device may then be configured to determine whether the operation from the request should be offloaded to the hardware offloading engine.

In some embodiments, the host device may be designed, programmed, or otherwise configured to provide (e.g., transmit/send) an offloading command to the server for hardware offloading operations/functionalities to the hardware offloading engines on the processor-enabled server (and/or the processor-enabled server may be designed, programmed, or otherwise configured to fetch the offloading command).

Based on the communication protocol/interface between the host device and the server and/or the type of hardware offloading engines, the offloading command may include (and/or be provided with), in command descriptor format, a pointer for a source and/or a destination for the data. Data locations for the processing (and/or writing) of the data by the hardware offloading engines may be provided in various locations, including, but not limited to host-side memory, device-side memory, at the storage device, in unified memory, or the like.

In prior systems, however, in order to access the memory (or storage) for the retrieving (and/or writing of the data), different indexing methods were used for accessing and/or identifying each different type of memory or storage, e.g., involving multiple commands. For example, different commands were used to define data transfer for each direction, e.g., input data source or output data destination, in which the greater the number of data location types, the more new commands may need to be defined. For example, in the example in which the source location or destination location may be one or more of the host memory, the device local memory, or at the storage, nine different possible data directions are provided, in which the nine different possible data directions would need separate commands for defining the direction of the data, as seen in the following Table 1:

TABLE 1

| Source | Destination | | |
| --- | --- | --- | --- |
| | Host memory | Device local memory | Storage |
| Host memory | 1 | 2 | 3 |
| Device local memory | 4 | 5 | 6 |
| Storage | 7 | 8 | 9 |

In some embodiments, the non-volatile storage system may use unified memory to provide a shared memory space where multiple heterogeneous computing devices, e.g., hardware accelerators and/or hardware offloading engines, may access common data. While unified memory may provide access to common data, the unified memory may not allow local memory of a device to be exposed, and may apply to only byte-addressable memory. As such, computer systems or data centers that utilize unified memory may still need additional commands to access data from other data sources and/or to access different output destinations, e.g., the storage device.

Methods, systems, and devices are described herein directed to optimizing non-volatile storage systems that use hardware offloading or hardware acceleration by utilizing a unified data pointer in the offloading command for the hardware acceleration and/or hardware offloading operations, for example, in heterogeneous storage and storage device systems having at least two types of data locations. The unified data pointer may be used to point to the specific memory location(s) from where the data is sourced, e.g., read, or where the data needs to be stored, e.g., written. That is, the methods, systems, and devices are designed, programmed, or otherwise configured to prepare and/or parse an offloading command that includes a data field for using a unified data pointer to identify a source of input data and/or a destination of output data, such that a single command may be used to represent all types of different data transfers/directions, e.g., different storage/memory locations for reading/writing data, e.g., Table 1 and/or from the various devices in a heterogeneous storage and storage device system.

FIG. 1 is a schematic view of an example cloud-based storage system 100, arranged in accordance with at least some embodiments described herein.

The system 100 may include terminal devices 110, 120, 130, and 140, a network 160, a host controller 170 (e.g., a host device), and server(s) 150a . . . 150n. It is to be understood that FIG. 1 only shows illustrative numbers of the terminal devices, the network, the host device, and the server(s). The embodiments described herein are not limited to the number of the terminal devices, the network, the host device, and/or the server described. That is, the number of terminal devices, networks, the host device, and/or servers described herein are provided for descriptive purposes only and are not intended to be limiting.

In accordance with at least some example embodiments, the terminal devices 110, 120, 130, and 140 may be various electronic devices and/or a digital or virtual device. The various electronic devices may include but not limited to a mobile device such as a smartphone, a tablet computer, an e-book reader, a laptop computer, a desktop computer, and/or any other suitable electronic devices or host for a browser or application.

In accordance with at least some example embodiments, the network 160 may be a medium used to provide a communications link between the terminal devices 110, 120, 130, 140 and the server 150a . . . 150n. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the host controller 170 may be a client or a server that links the servers 150a . . . 150n together, e.g., in the data center or link other host controllers, e.g., in other data centers. The host controller 170 may be designed, programmed, or otherwise configured to send and/or receive applications, services, data, or the like to the connected devices/components.

In accordance with at least some example embodiments, the server 150a . . . 150n may be a server for providing various services, such as a server for providing cloud services (including e.g., cloud storage, retrieval service, big data analytics, machine learning, data mining, etc.) to end users using one or more of the terminal devices 110, 120, 130, and 140. The server 150a . . . 150n may be implemented as a data center that includes a distributed server cluster including multiple servers 150a . . . 150n or that includes a single server. In some embodiments, one or more data centers may be in communication with each other over network 160. The server 150a . . . 150n may also include a controller for controlling the hardware and/or storing software and firmware and providing the functionalities of the server.

In some embodiments, the server(s) 150a . . . 150n may include or be in communication with storage device(s), e.g., non-volatile memory (NVM) solid state drives (SSDs), e.g., flash memory, using various communication interfaces that allow for quick data storage and/or retrieval on/from the storage device(s). In some embodiments, the communication interface between the host device and server 150a . . . 150n may be the NVMe or non-volatile memory host controller interface protocol. The NVMe protocol was developed in response to the need for a faster interface between central processing units (CPUs) and SSDs. NVMe may be a logical device interface for accessing the SSDs connected to the server controller, for example, via a Peripheral Component Interconnect Express (PCIe) bus that provides a leaner interface for accessing the SSDs.

An end user may use one or more of the terminal devices 110, 120, 130, and 140 to interact with the server(s) 150a . . . 150n via the network 160. In some embodiments, various applications, such as social media applications, social networking applications, shopping applications, gaming applications, or the like, may be installed on or accessibly with the terminal devices 110, 120, 130, and 140. In some embodiments, the end user may request big data analytics or data mining on data on the storage devices connected to the server(s) 150a . . . 150n and/or data residing or provided to the cloud computing system for supporting data analytics, learning models or the like.

It is to be understood that software applications or services according to the embodiments described herein and/or according to the services provided by the cloud service providers may be performed by the host controller 170, the server 150a . . . 150n and/or the terminal devices 110, 120, 130, and 140 (which may be referred to herein as user devices). Accordingly, the apparatus for the software applications and/or services may be arranged in the host controller 170, the server 150a . . . 150n, and/or in the terminal devices 110, 120, 130, and 140.

It is also to be understood that in a case that a service is not performed remotely, the system 100 may not include the network 160, but include only the terminal device 110, 120, 130, and 140, the host controller 170, and/or the server 150a . . . 150n.

It is further to be understood that the terminal device 110, 120, 130, and 140, the host controller 170, and/or the server 150a . . . 150n may each include one or more processors, firmware, and a storage device storing one or more programs. The terminal device 110, 120, 130, and 140, the host controller 170, and/or the server 150a . . . 150n may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
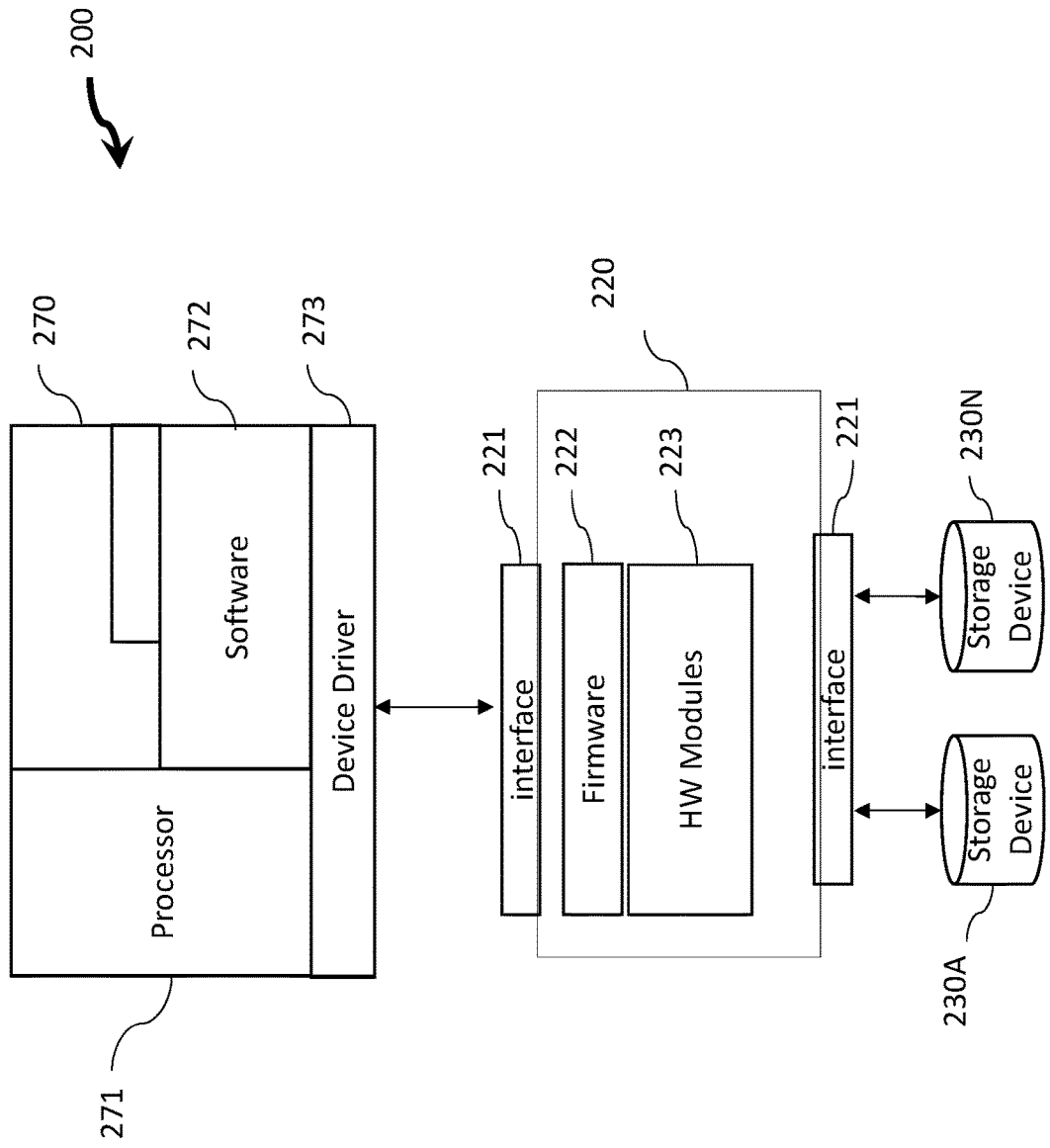
FIG. 2 is a schematic view of an example working node in a data center, arranged in accordance with at least some embodiments described herein.

FIG. 2 is a schematic view of an example working node for non-volatile storage device(s) in a data center architecture 200, arranged in accordance with at least some embodiments described herein.

The data center architecture 200 includes at least a host device 270, a hardware offloading engine 220, and one or more storage devices 230A . . . 230N. In an example embodiment, the data center architecture 200 may include one or more host devices 270 and/or one or more hardware offloading engine(s) 220, which may be on or in communication with one or more of the server(s), e.g., 150a . . . 150n of FIG. 1. The embodiments described herein are not limited to the number of the host devices, the hardware offloading engines, and/or the storage devices described. That is, the number of host devices, the hardware offloading engines, and/or the storage devices described herein are provided for descriptive purposes only and are not intended to be limiting.

In accordance with at least some example embodiments, the host device 270 may be the host controller 170 of FIG. 1 and may be in communication with one or more of the servers, e.g., 150a . . . 150n, and/or one or more of the hardware offloading engine(s) 220. In some embodiments, the host device 270 may be a controller, central processing unit (CPU), or software on one or more of the servers or on a central node in the data center architecture 200. In some embodiments, the host device 270 may include a processor 271 and one or more software applications 272 for operating, manipulating, reading, writing, deleting, storing, or otherwise accessing the data (and/or the block addresses) on the host device 270 itself, the hardware offloading engine(s) 220, and/or the storage devices 230A . . . 230N. For example, when the host device 270 reads data from the storage devices 230A . . . 230N, the host device 270 may receive data from the hardware offloading engine 220, e.g., stored on device memory or directly from the storage device 230A . . . 230N. When the host device 270 writes and/or provide commands to write data to the storage devices 230A . . . 230N, the host device 270 may send the data and/or send a command with an output destination to the hardware offloading engine 220.

In some embodiments, the host device 270 may be designed, programmed, or otherwise configured to support big data analytics systems and/or, in combination, with business intelligence solutions that collect, process, scrub, and analyze big data, e.g., data mining, predictive analytics, real-time analytics, or the like. In some embodiments, the host device 270 may be designed, programmed, or otherwise configured to receive input data from the end user and/or retrieve (or provide an address to) input data for the big data analytics and/or business intelligence solutions, e.g., input data stored on the host device 270 memory, the hardware offloading engine 220 memory, e.g., device memory, and/or the storage device 230A . . . 230N. The host device 270 may include one or more software applications 272 to support the big data analytics system on the frontend, e.g., presentation layer, and may include one or more of application programming interface(s) (APIs), software development kit(s) (SDKs), device driver(s) 273, runtime library(ies), software plug-in(s), management tool(s), or the like. The APIs and/or SDKs may be hierarchical to provide end users with a set of operations at different levels. The operations may be computationally intensive operations that require high amounts of processing capabilities, e.g., by the CPU. In some embodiments, the APIs and/or SDKs may be designed, programmed, or otherwise configured to translate operations to hardware understandable commands. The runtime library(ies) may be provided to provide a set of low-level functions at runtime for resource scheduling and task management. The software plugin(s) may be provided to allow targeting use cases to realize pluggable offloading. The management tools may be provided to monitor health and/or performance of the data center architecture 200 and/or components therein and administer jobs/operations for the components therein.

The device driver 273 may be provided to provide a software library for initializing hardware and manage access to the hardware by higher layers of software. In some embodiments, the device drivers may be designed, programmed, or otherwise configured to provide a Peripheral Component Interconnect Express (PCIe) device class hardware abstraction server for the hardware offloading engine 220 that supports NVMe protocols for storage access and transport and/or vendor specific commands. As such, the device drivers 273 may be designed, programmed, or otherwise configured to be in communication with the hardware offloading engine 220 and/or the server, e.g., 150*a* . . . 150*n*, e.g., create/send/transfer a hardware offloading command and/or send/receive/delete data. While the PCIe and NVMe protocols are discussed herein, such disclosure is not intended to be limiting, but rather other interfacing protocols may be used for the communication between the host device 270 and the hardware offloading engine 220.

In accordance with at least some example embodiments, the hardware offloading engine 220 may be software or a card insertable into the server (e.g. 150*a* . . . 150*n*), for example, an add-in card, such as a PCIe card or PCI card, to be connected directly to or remotely with, e.g., in communication with, the storage device 230A . . . 230N and/or the host device 270. The hardware offloading engine 220 may include one or more of an interface 221, one or more of processors, CPUs, or controllers, e.g., double data rate (DDR) memory controller(s), system management bus (SMBUS) management controller(s), NVMe controller(s), or the like, firmware 222, hardware accelerator modules 223, static random-access memory (SRAM), dynamic random-access memory (DRAM), or the like.

In some embodiments, the interface 221 may be designed, programmed, or otherwise configured to provide communications with the host device 270, e.g., interface for motherboard components to provide point-to-point connections and/or remote connections. In some embodiments, the interface 221 may be a PCIe card, e.g., slot interface with 16 lanes. In some embodiments, interface 221 may also be provided to communicate with the storage devices 230A . . . 230N and may be a PCIe card, e.g., slot interface with 4 lanes.

In some embodiments, the hardware accelerator modules 223 may be designed, programmed, or otherwise configured to perform hardware offloading functions/operations. The hardware accelerator modules 223 may include and/or be implemented as software, firmware, application specific integrated circuits (ASICs), graphics processing units (GPU), and/or field programmable gate arrays (FPGAs) or the like. The hardware accelerator modules 223 may be connected to the host device 270 via interface bus 221 with the hardware accelerator modules 223 interfacing with the host device 270 via the device drivers 273 that are specific to the particular software and hardware platform utilized for acceleration or hardware offloading, e.g., for the big data analytics. As such, the hardware accelerator modules 223 may be designed, programmed, or otherwise configured to provide NVMe controller functionalities to the host device 270 and/or act as a host to the storage devices 230A . . . 230N. In some embodiments, the hardware accelerator modules 223 may include hardware level functionalities including, but not limited to, selection, decompression, compression, filtering, projection, aggregation, comparing, adding, subtraction, division, multiplication, shifting, inclusive or (OR), exclusive or (XOR), data mining, data analysis, and/or the like. In some embodiments, the hardware accelerator modules 223 may be linked dynamically to form a pipe-line given query execution framework, e.g., ASICs or FPGAs in series, parallel, and/or GPUs, or the like, and also may be re-programmable when end users want different execution(s), e.g., different operations will be offloaded.

In some embodiments, firmware 222 may be provided on-disk or as downloadable software on the hardware offloading engine 220 for providing low-level control for device specific hardware, e.g., on the hardware offloading engine 220. In some embodiments, the firmware 222 may be designed, programmed, or otherwise configured to manage multiple storage devices 230A . . . 230N attached thereto and/or provide access to (or retrieve) input data from a source location or write output data to a destination location, e.g., host memory, device memory, or device storage. The firmware 222 may also be designed, programmed, or otherwise configured to provide the software controls for the hardware accelerator modules 223 to provide the offloading functionalities/operations and may include one or more of a hardware abstract layer (HAL) module, a frontend module, a core module, a monitoring module for monitoring the health/performance and administrating operations/jobs for the hardware offloading engine 220, and a backend module. As such, the firmware 222 may further be designed, programmed, or otherwise configured to provide the hardware offloading engine 220 the virtual NVMe storage functionality for the host device 270, management of multiple storage devices 230A . . . 230N, and/or NVMe protocol offloading functionality/operation, e.g., query offloading functions using the hardware accelerator modules 223, e.g., for big data analytics acceleration processes.

The HAL module may include, but not limited to, a SMBUS module, non-volatile memory module, a serial peripheral interface (SPI) module, input/output (I/O) engine module, PCIe module, and an offloading engine module for providing the software layer for execution by the corresponding hardware. For example, in an embodiment, the HAL offloading engine module may be designed, programmed, or otherwise configured as a driver layer to provide APIs to the hardware accelerator modules 223, e.g., execution instructions for the offloading functionalities/operations by the FPGAs, ASICs, and/or GPUs.

The frontend module may include, but not limited to, one or more handler modules, including, but not limited to, an administration command handler module, an I/O command handler module, a vendor command handler module, and an offload command handler module, which may be vendor specific, for providing the virtual NVMe device functionality and/or software layer for command execution for the associated hardware. For example, in an embodiment, the offload command handler module may be designed, programmed, or otherwise configured to be the frontend module for fetching host requests, e.g., the offloading command, and returning responses to the request back to the host device 270.

The core module may include, but not limited to a core API module, a firmware manager module, a virtual namespace manager module, a metadata manager module, a telemetry and logging module, SSD manger module, a card manager module, and a micro query processor module for providing the software and/or instructions for the hardware of the hardware offloading engine 220, e.g., core hardware, FPGAs, ASICs, GPUs, etc. In an embodiment, for example, the micro query processor module may be designed, programmed, or otherwise configured to provide the instructions and/or commands for the offloading functionalities/operations, e.g., handling the offloading execution, such as selection, comparison, decompression, compression, decoding, filtering, projection, or the like.

The backend module may include, but not limited to the interface module 221 that is in communication with the storage devices 230A . . . 230N, e.g., data access layer. In some embodiments, the interface module 221 may include the software and/or provide the instructions/executions to implement the NVMe storage access and transport protocol, such as, the PCIe interface, for the writing of the output data from the hardware offloading engine 220.

In accordance with at least some example embodiments, the storage devices 230A . . . 230N may include non-volatile memory (NVM), such as flash memory. As such, the storage devices 230A . . . 230N may be NVM solid state drives (SSD) which may allow data storage and retrieval more quickly. As discussed above, the storage devices 230A . . . 230N may be in communication with the host device 270 via the hardware offloading engine 220.

Referring back to FIG. 2, in an example embodiment for the acceleration process in the data center architecture 200, the host device 270 may provide, and/or the hardware offloading engine 220 may fetch, vendor-specific offloading command entry(ies) for the hardware offloading functionality/operation (referred to herein as "offloading operation"). The hardware offloading command entry may be 32-bytes, 64-bytes, 128 bytes, 256 bytes, or the like to provide the instructions for the hardware offloading operation by the hardware offloading engine. The hardware offloading command entry may be provided in a command descriptor format and may include a hardware offloading operation code (e.g., opcode) layer, input pointer, input size, output pointer, and output size, with 8, 16, 32 or 64-bit field entries or other size as necessary, as further discussed below. That is, the size of the field entry is not limited to a particular bit field entry, but rather, may be dependent on the nature of the source location and/or destination location, e.g., memory address, the number of different source locations and/or destination locations, the specific transmission protocol used, or the like, and may be defined or assigned based on the specific use of the protocol, e.g., provided in an instruction manual for the protocol.

The hardware offloading engine 220 may be designed, programmed, or otherwise configured to then parse the hardware offloading command entry to perform the necessary operation based on the hardware offloading command entry. In some embodiments, input data may be retrieved (or transferred) from one or more input data sources, such as, memory on the host device 270, memory on the hardware offloading engine 220, the storage devices 230A . . . 230N, network memory, or unified memory, for the hardware offloading engine 220, such that the offloading operation may be performed on the input data by the hardware offloading engine 220, e.g., via the hardware accelerator modules 223. In some embodiments, the offloading command received by hardware offloading engine 220 from the host device 270 may contain an access address for accessing the input data, e.g., file path or the like, in which the hardware accelerator (or firmware) is designed, programmed, or otherwise configured to access the file path, locate the sought input data, read blocks pertaining to the file data, execute the acceleration process or operation, and transfer output data, e.g., to a file path or the like.

For example, in an embodiment, when the parsed layer for the opcode from the hardware offloading command entry is "project," the hardware offloading engine 220 may offload the project operation from the host device 270, e.g., addition, subtraction, multiplication, comparison, filter, XOR, decompression, compression, or the like, and may be designed, programmed, or otherwise configured to initiate data transfer from a source location, e.g., memory on the host device 270 (and/or memory on the hardware offloading engine 220, or storage device 230A . . . 230N) and to perform the offloaded operation, e.g., via the FPGAs, ASICs, and/or GPUs. After the offloaded operation is executed by at least one hardware accelerator module(s) 223, the hardware offloading engine 220 may be designed, programmed, or otherwise configured to write the processed data to a destination source, e.g., memory on the host device 270, memory on the hardware offloading engine 220, or on the storage device 230A . . . 230N, based on the output pointer (and output size). In some embodiments, either after the writing of the output data or completion of the offloading operation, a completion command may be returned to the host device 270.

FIGS. 3A, 3B, 3C, 3D, and 4 illustrate an exemplary embodiment, in which a host device, e.g., 470 (or 270 of FIG. 2), and/or a hardware offloading engine, e.g., 420 (or 220 of FIG. 2), may be designed, programmed, or otherwise configured to optimize the hardware offloading or hardware acceleration process for non-volatile storage systems by utilizing hardware offloading command(s) that includes a unified data pointer for identifying a source location or a destination location, e.g., the specific memory location from where the data is sourced or where it needs to be stored. For example, in some embodiments, a host device, e.g., 270 or 470, may be designed, programmed, or otherwise configured to offload an operation from the host device, e.g., 270 or 470, to a hardware offloading engine, e.g., 220 or 420, which may include one or more hardware accelerator modules which may include and/or be implemented as software, firmware, application specific integrated circuits (ASICs), graphics processing units (GPU), and/or field programmable gate arrays (FPGAs) or the like, e.g., to offload computationally intensive operations from the host device, e.g., 270 or 470, that require high amounts of processing capabilities by the CPU to hardware on the hardware offloading engine, e.g., 220 or 420. As such, the host device 270 or 470 may be designed, programmed, or otherwise configured to prepare a hardware offloading command entry 302 to provide the set of instructions/operations for execution/offloading by the hardware accelerator modules, e.g., on the hardware offloading engine, e.g., 220 or 420. In an embodiment, the hardware offloading command entry 302 may be in command descriptor format and may include fields 305, including, but not limited to, hardware offloading operation type (e.g., opcode), input pointer, input size of the input data, output pointer, output size, and/or flags, in which the data describing and/or characterizing the request (and/or input/output data) is used in the corresponding fields for the hardware offloading command entry. It is understood that the fields described herein are not intended to be limiting but provided for illustration purposes.

In some embodiments, in order to simplify commands for data transfers between different memory locations, the input pointer and/or the output pointer may use a unified indexing mechanism or unified data pointers, such as, host-side memory pointers, e.g., memory addresses in the computer's main memory of the host device, e.g., 270 or 470, device-side memory pointers (memory address in the hardware offloading engine, e.g., 220 or 420), and/or storage pointers (memory on the storage block 230A . . . 230N or 430). Thus, the embodiments discussed herein use a single command entry that remains the same regardless of the source and/or destination of the data transfer by using the unified data pointer that points to the specific memory location from where the data is sourced or where it needs to be stored. Accordingly, data center architectures utilizing the unified data pointer may not have to use new and/or complex commands for each type of data transfer, e.g., different source or destination locations, but instead use the single command entry to identify the data transfer/direction, which may reduce the software complexity and development effort for the software, e.g., by the programmer or developer.

For example, as illustrated in FIG. 3A, the hardware offloading command entry 302 may be in command descriptor format and may include fields 305, such as, hardware offloading operation type (e.g., opcode), input pointer, input size of the input data, output pointer, output size, and/or flags. In some embodiments, at least one of the input pointer 312 and/or the output pointer 313 includes a unified data pointer B. The unified data pointer B may include one or more bits of memory and may be used as an identifier for identifying and/or defining one or more source locations and/or destination locations, and may be dependent on the various devices in the heterogeneous storage and storage device system. That is, the amount of the one or more bits of memory used for the unified data pointer B may depend on the number of source locations and/or destination locations, e.g., more memory may be allocated depending on the number or amount of source locations and/or destination locations for the various devices in a heterogeneous computing system. For example, in a non-limiting embodiment, the unified data pointer B may be used to define and/or identify, the memory on the host device, e.g., 270 or 470, the memory on the hardware offloading engine, e.g., 220 or 420, the storage device, e.g., 230A . . . 230N or 430, a unified memory, or other location having input data for processing by the hardware acceleration module or for writing output data from the hardware acceleration module. The unified data pointer B may be a portion or part of the memory, e.g., memory address, of the command entry field for the input (or output) pointer, e.g., 2, 4, or 6 bits of a 64-bit field entry for the input pointer (or output pointer), and may be used as the identifier for the source of the input data and/or the destination location for storing the output data. In some embodiments, the unified data pointer B including the one or more bits of memory may include a binary 2-bit entry or identifier, e.g., 00, 10, 11, etc., for identifying the source or destination location.

For example, as illustrated in FIGS. 3B, 3C, 3D, in some embodiments, the binary bit entry "00" may represent or define a source and/or destination location as being memory on the host device, e.g., 270 or 470, the bit entry "10" may represent or define a source and/or destination location as being memory on the hardware offloading engine, e.g., 220 or 420, and the bit entry "11" may represent or define a source and/or destination location as being the storage device address. In some embodiments, the unified data pointer B may be provided at the beginning of the input pointer 312 or output pointer 313, e.g., an amount or portion of the memory address for the input data or output data. As such, when the hardware offloading command entry 302 is parsed, e.g., by the hardware offloading engine, e.g., 220 or 420, and/or prepared, e.g., by the host device 270 or 470, the unified data pointer B may be used as an indicator for providing (or identifying) the remaining information (e.g., type) to be used or necessary for the input pointer 312 and/or output pointer 313, e.g., address, block number, device address, or the like. For example, in an embodiment when the binary bit entry is "00," the host device, e.g., 270 or 470, and/or the hardware offloading engine, e.g., 220 or 420, may be designed, programmed, or otherwise configured to understand that the bit entry "00" is being used to identify that the input data (or output data) is being provided from (or is being provided to) the memory in the host device, e.g., 270 or 470. As such, the host device, e.g., 270 or 470, and/or the hardware offloading engine, e.g., 220 or 420, may be configured to understand and/or expect that the input pointer 312 may further include the memory address of the host device. Similarly, in an embodiment when the binary bit entry is "10," the host device, e.g., 270 or 470, and/or the hardware offloading engine, e.g., 220 or 420, may be designed, programmed, or otherwise configured to understand that the bit entry "10" is being used to identify that the input data (or output data) is being provided from (or being provided to) the memory in the hardware offloading engine, e.g., 220 or 420. As such, the host device, e.g., 270 or 470, and/or the hardware offloading engine, e.g., 220 or 420, may be configured to understand and/or expect that the input pointer 312 may further include the device address and local memory address, e.g., on the hardware offloading engine. In an embodiment when the binary bit entry is "11," the host device, e.g., 270, and/or the hardware offloading engine, e.g., 220, may be designed, programmed, or otherwise configured to understand that the bit entry "11" is being used to identify that the input data (or output data) is being provided directly from (or being provided directly to) the storage device, e.g., 230A . . . 230N or 430. As such, the host device, e.g., 270 or 470, and/or the hardware offloading engine, e.g., 220 or 420, may be configured to understand and/or expect that the input pointer 312 may further include the storage device address and block number for the associated storage device. In some embodiments, the unified data pointer B may include defined identifiers, e.g., binary bit entries or bits of memory that are used to define or identify the source location and/or destination location, e.g., is provided based on the protocol used for communication with the non-volatile storage device and devices in the computing system.

It is appreciated that while the unified data pointer B is described herein as being a 2, 4, or 6-bit entry, such disclosure is not intended to be limiting. Rather, the size and/or use of the bit identifier, e.g., 2-bit identifier, used for the unified data pointer B may depend on the use and the number of source/destination locations, in which different types, sources, or locations of memory may be used for more complex situations, e.g., multiple data centers or server locations, one or more input (or output) data locations, or the like. That is, the size and/or amount of bits used for the unified data pointer B is not limited herein, but rather, provided as exemplary embodiments, in which the unified data pointer B may be determined by the number of memory locations to be used as the source locations and/or the destination locations. As such, additional or new complex commands are not necessary for each type of data transfer, but rather, the unified data pointer architecture may be used to simplify the data transfer commands between different memory locations, which may reduce software complexity and/or development effort for the software, e.g., by the programmers or developers.

Figure 4:
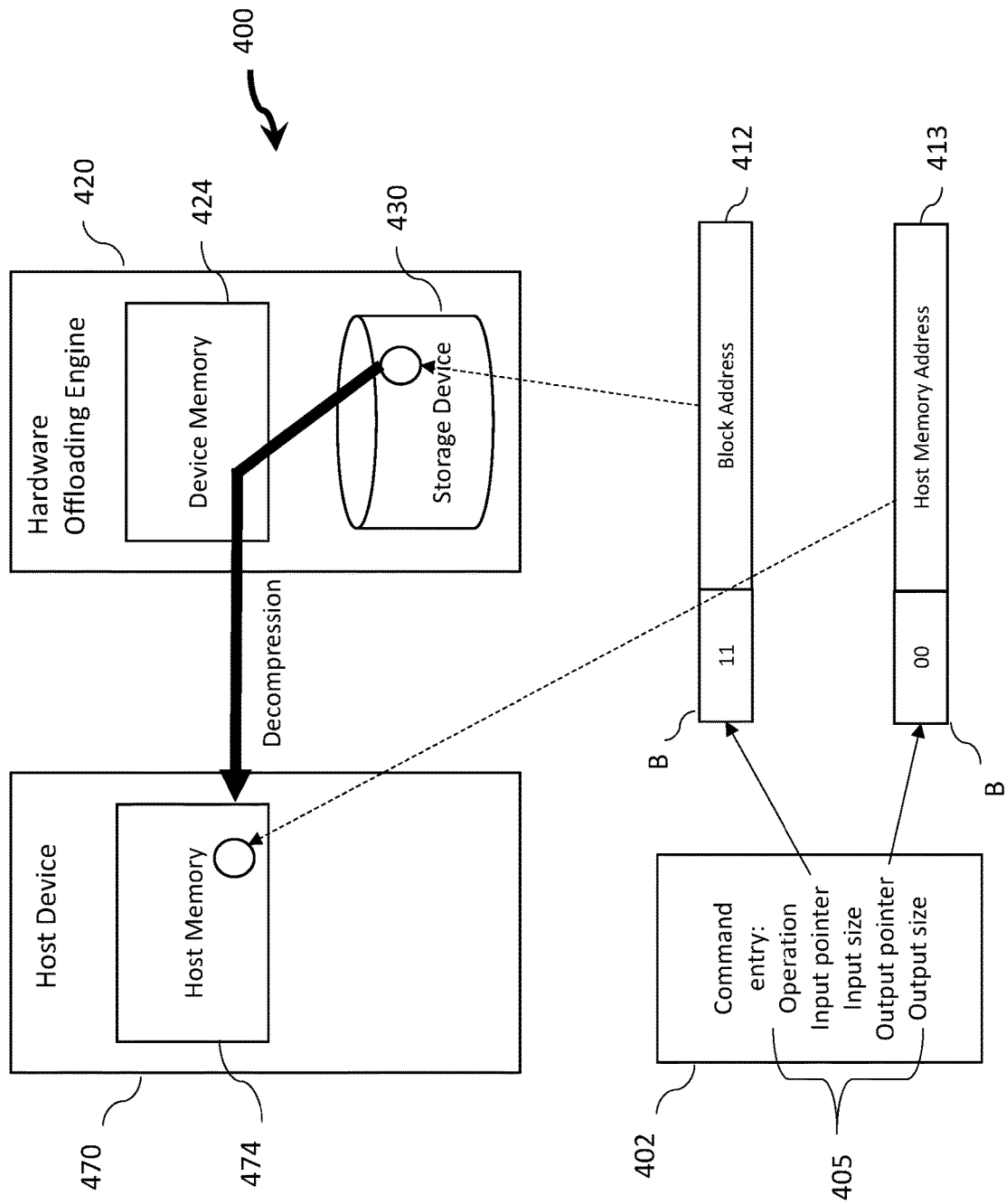
FIG. 4 is a schematic representation of an example offloading command in an example working node in a data center, arranged in accordance with at least some embodiments described herein.

FIG. 4 is a schematic view of an example working node for non-volatile storage device(s) in a data center architecture 400, arranged in accordance with at least some embodiments described herein.

The data center architecture 400 includes at least a host device 470, a hardware offloading engine 420, and one or more storage devices 430.

In accordance with at least some example embodiments, the host device 470 may be the host controller 170 of FIG. 1 or host device 270 of FIG. 2 and may be in communication with one or more of the servers, e.g., 150a . . . 150n, and/or one or more of the hardware offloading engine(s) 420 (or 220 of FIG. 2). In some embodiments, the host device 470 may be designed, programmed, or otherwise configured to support big data analytics systems and/or, in combination, with business intelligence solutions that collect, process, scrub, and analyze big data, e.g., data mining, predictive analytics, real-time analytics, or the like. In some embodiments, the host device 470 may be a controller, a central processing unit (CPU), or software on one or more of the servers or on a central node in the data center architecture 400. In some embodiments, the host device 470 may include a processor and one or more software applications for operating, manipulating, reading, writing, deleting, storing, or otherwise accessing the data (and/or the block addresses) on the host device 470 itself, the hardware offloading engine(s) 420, and/or the storage device 430. For example, when the host device 470 reads data from the storage device 430, the host device 470 may receive data from the hardware offloading engine 420, e.g., stored on device memory or directly from the storage device 430. When the host device 470 writes and/or provide commands to write data to the storage device 430, the host device 470 may send the data and/or send a command with a destination pointer for the output data to the hardware offloading engine 420.

In some embodiments, the host device 470 may be designed, programmed, or otherwise configured to receive input data from the end user and/or retrieve (or provide an address to) input data for the big data analytics and/or business intelligence solutions, e.g., input data stored on the host device 470 memory, the hardware offloading engine 420 memory, e.g., device memory, and/or the storage device 430. The host device 470 may include one or more software applications to support the big data analytics system on the frontend, e.g., presentation layer, and may include one or more of application programming interface(s) (APIs), software development kit(s) (SDKs), device driver(s), runtime library(ies), software plug-in(s), management tool(s), or the like. The APIs and/or SDKs may be hierarchical to provide end users with a set of operations at different levels. The operations may be computationally intensive operations that require high amounts of processing capabilities, e.g., on the CPU. In some embodiments, the APIs and/or SDKs may be designed, programmed, or otherwise configured to translate operations to hardware understandable commands.

For example, in an embodiment, the host device 470 may receive a request to support big data analytics, such as, collecting, processing, scrubbing, and/or analyzing one or more input data streams. The host device 470 may then be configured to receive, retrieve, e.g., read, or otherwise access the input data from different memory locations, in which the SDKs and/or APIs on the host device 470 may be designed, programmed, or otherwise configured to analyze, process, and/or determine from the request(s) data describing and/or characterizing the request (and/or location(s) for accessing the input data). As such, the host device 470 may be configured to provide, send, and/or prepare the hardware offloading command entry 402 for the hardware offloading engine 420 to perform the hardware offloading operation. In some embodiments, the command entry 402 includes, but not limited to, a hardware offloading operation code (e.g., opcode), input pointer 412, input size, output pointer 413, output size, and/or flags. The hardware offloading operation code may correspond to the offloading operation from the host device 470, which may include, but not limited to, select, project, such as, addition, subtraction, multiplication, comparison, filter, XOR, decompression, or compression, or the like.

In accordance with at least some example embodiments, the hardware offloading engine 420 may be software or a card insertable into the server (e.g. 150a . . . 150n), for example, an add-in card, such as a PCIe card or PCI card, to be connected directly to or remotely with, e.g., in communication with, the storage device 430 and/or the host device 470, or a combination thereof. The hardware offloading engine 420 may include one or more of an interface, one or more of processors, CPUs, or controllers, e.g., double data rate (DDR) memory controller(s), system management bus (SMBUS) management controller(s), NVMe controller(s), or the like, firmware, hardware accelerator modules, static random-access memory (SRAM), dynamic random-access memory (DRAM), or the like.

In some embodiments, the hardware accelerator module(s) may be designed, programmed, or otherwise configured to perform hardware offloading functions/operations. The hardware accelerator modules may include and/or be implemented as software, firmware, application specific integrated circuits (ASICs), graphics processing units (GPU), and/or field programmable gate arrays (FPGAs) or the like. The hardware accelerator modules may be connected to the host device 470 via interface bus with the hardware accelerator modules interfacing with the host device 470 via the device drivers that are specific to the particular software and hardware platform utilized for acceleration or hardware offloading, e.g., for the big data analytics. As such, the hardware accelerator modules may be designed, programmed, or otherwise configured to provide NVMe controller functionalities to the host device 470 and/or act as a host to the storage device 430. In some embodiments, the hardware accelerator modules may include hardware level functionalities including, but not limited to, selection, decompression, compression, filtering, projection, aggregation, comparing, adding, subtraction, division, multiplication, shifting, inclusive or (OR), exclusive or (XOR), data mining, data analysis, and/or the like.

In some embodiments, firmware may be provided on-disk or as downloadable software on the hardware offloading engine 420 for providing low-level control for device specific hardware, e.g., the hardware accelerator modules. In some embodiments, the firmware may be designed, programmed, or otherwise configured to manage one or more storage device(s) 430 attached thereto and/or provide access to (or retrieve) input data from a source location or write output data to a destination location, e.g., host memory, device memory, or device storage. The firmware may also be designed, programmed, or otherwise configured to provide the software controls for the hardware accelerator modules to provide the offloading functionalities/operations and may include one or more of a hardware abstract layer (HAL) module, a frontend module, a core module, a monitoring module for monitoring the health/performance and administrating operations/jobs for the hardware offloading engine 420, and a backend module. As such, the firmware may further be designed, programmed, or otherwise configured to provide the hardware offloading engine 420 the virtual NVMe storage functionality for the host device 470, management of one or more storage device(s) 430, and/or NVMe protocol offloading functionality/operation, e.g., query offloading functions using the hardware accelerator modules, e.g., for big data analytics acceleration processes.

In accordance with at least some example embodiments, the storage device 430 may include non-volatile memory (NVM), such as flash memory. As such, the storage device 430 may be NVM solid state drives (SSD) which may allow data storage and retrieval more quickly. As discussed above, the storage device 430 may be in communication with the host device 470 via the hardware offloading engine 420.

Referring back to FIG. 4, in an example embodiment for the hardware offloading or acceleration process in the data center architecture 400, the host device 470 and/or the hardware offloading engine 420 may be designed, programmed, or otherwise configured to optimize the hardware offloading or hardware acceleration process(es) for non-volatile storage systems by utilizing hardware offloading command(s) that includes a unified data pointer for identifying a source location and/or a destination location. As such, a unified indexing mechanism or unified data pointer may be provided that simplifies the parsing and/or preparing of offloading commands that includes data transfers using one or more memory locations, such as, host-side memory pointers, e.g., memory addresses in the computer's main memory of the host device 470, device-side memory pointers (memory address in the hardware offloading engine 420), and the storage device 430. Thus, distinct commands and operations tailored for specific data transfers between different memory locations, e.g., separate commands for different data locations, such as transferring data from the main memory to a hardware offloading engine 420 memory or vice versa, which previously require additional complexity in the software or firmware development and may lead to inefficiencies, are not necessary. That is, the embodiments discussed herein use a single command entry that remains the same regardless of the source and/or destination of the data transfer by using the unified data pointer that points to the specific memory location from where the data is sourced or where it needs to be stored. Accordingly, data center architectures utilizing the unified data pointer may not have to use new and/or complex commands for each type of data transfer, e.g., different source or destination locations, but instead use the single command entry, which may reduce the software complexity and development effort for the software. While the unified data pointer B as discussed herein may be used to identify different memory locations, such disclosure is not intended to be limiting, such that the unified data pointer B may also be used to identify the same memory location, e.g., the input pointer and the output pointer both include data from/to the host device. In some embodiments, the unified data pointer B may be used in a single command entry for both the source and destination location, e.g., two bit entries to the same address.

For example, in an embodiment, the host device 470 may provide, and/or the hardware offloading engine 420 may fetch, vendor-specific offloading command entry(ies) 402 for the hardware offloading functionality/operation (referred to herein as "offloading operation"), e.g., decompression. The hardware offloading command entry 402 may be provided in command descriptor format having one or more fields 405, including, but not limited to, a hardware offloading operation code (e.g., opcode), e.g., decompression, input pointer 412, input size, output pointer 413, and output size. In some embodiments, at least one of the input pointer 412 and/or the output pointer 413 includes a unified data pointer B. The unified data pointer B may include one or more bits of memory that may be used as an identifier for identifying and/or defining one or more source locations and/or destination locations. The amount of the one or more bits of memory used for the unified data pointer B may depend on the number of source locations and/or destination locations, e.g., more memory may be allocated depending on the number or amount of source locations and/or destination locations. For example, in a non-limiting embodiment, the unified data pointer B may be used to define and/or identify the memory 474 on the host device 470, the memory 424 on the hardware offloading engine 420, and/or the storage device 430, e.g., block address. The unified data pointer B may be a portion or part of the memory of the command entry field for the input (or output) pointer, e.g., 2-bits of a 64-bit field entry for the input pointer (or output pointer), and may be used as the identifier for the source of the input data or the destination location for storing the output data. While a 64-bit field entry for the input pointer (or output pointer) is discussed herein, such disclosure is not intended to be limiting, but rather, the size of the field entry may be understood to be dependent on the type of transmission protocol, and may be defined by the instructions for implementing such protocol.

As illustrated in FIG. 4, when the input pointer 412 includes the unified data pointer B including the binary bit entry "11," the hardware offloading engine 420 may be designed, programmed, or otherwise configured to understand that the bit entry "11" is being used to identify that the input data is provided on the storage device 430 such that the hardware offloading engine 420 is configured to retrieve the input data from the storage device 430 at the block address identified in the input pointer 412. As such, the hardware offloading engine 420 (and/or the hardware accelerator modules and/or firmware) is designed, programmed, or otherwise configured to access the file path at the block address, locate the sought input data, e.g., based on the input size to select the appropriate or specific file, e.g., 8, 32, 64, 128, or 256 MB file from a starting address provided by the input pointer 412, read blocks pertaining to the file data, and execute the acceleration process or operation, e.g., decompression. After completion of the offloaded operation by the hardware offloading engine 420, when the output pointer 413 includes the unified data pointer B including the binary bit entry "00," the hardware offloading engine 420 may be designed, programmed, or otherwise configured to understood that the bit entry "00" is being used to identify the destination location for the output data to be stored (or written), e.g., to the memory 474 on the host device 470. As such, the hardware offloading engine 420 (and/or the hardware accelerator modules) is designed, programmed, or otherwise configured to write the output data to the file path at the host memory address with the corresponding data output size, e.g., during the writing of the output data from the hardware offloading engine 420 at the specified host memory address for the host memory 474 on the host device 470 provided in the output pointer 413, the processed data size, e.g., 8, 32, 64, 128, or 256 MB file, may be used to determine the completion of the writing from the starting address of the host memory address. In some embodiments, the output size may be known by the host device 470 prior to completion of the hardware offloading operation. In some embodiments, the output size may be updated after generation of the output data by the hardware offloading engine 420. In still other embodiments, the host device 470 may only receive a completion command, for example, when the offloaded operation includes a read/write operation for the output data on the storage device 430 after completion of the offloaded operation by the hardware offloading engine 420.

Figure 5:
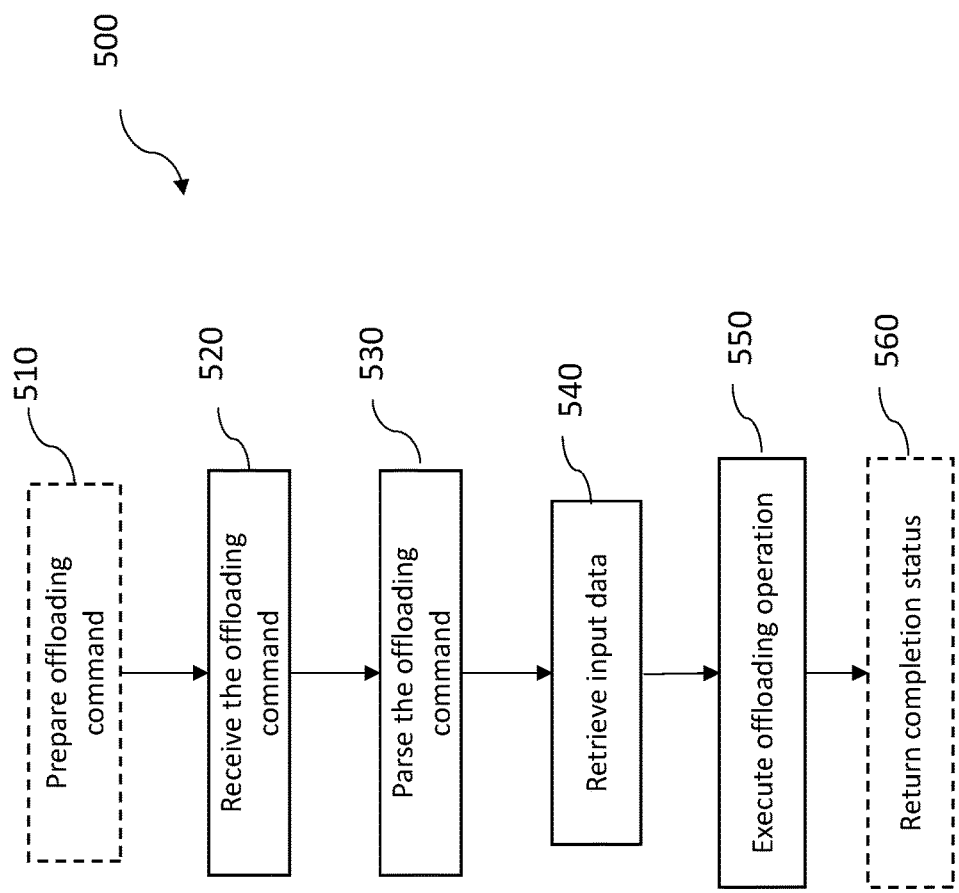
FIG. 5 is a flow chart illustrating an example offloading operation, in accordance with at least some embodiments described herein.

FIG. 5 is a flow chart illustrating an example processing flow 500 of offloading an operation in a computer network system, in accordance with at least some embodiments described herein.

Figure 6:
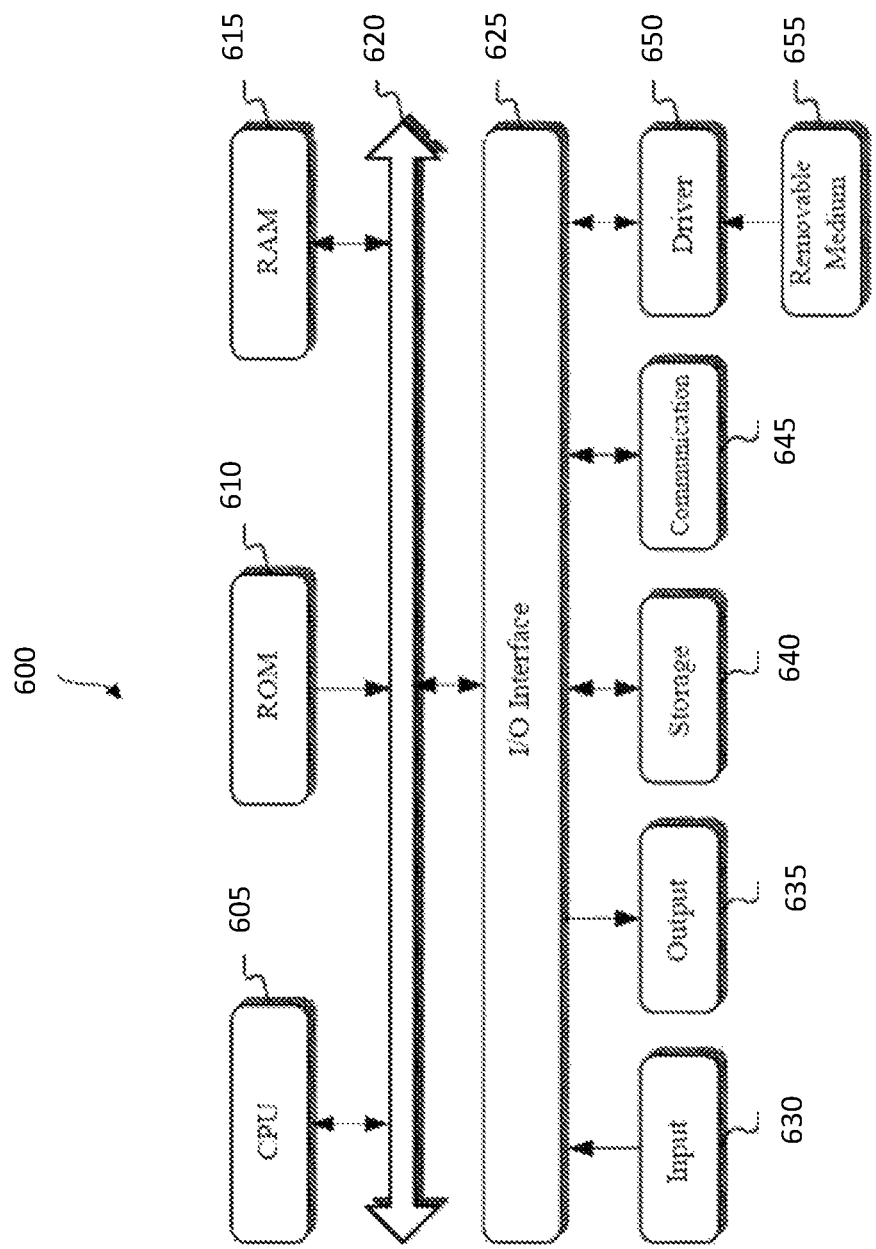
FIG. 6 is a schematic structural diagram of an example computer system applicable to implementing a device, arranged in accordance with at least some embodiments described herein.

It is to be understood that the processing flow 500 disclosed herein can be conducted by one or more processors such as a local device management CPU of the device, including e.g., the processor(s) of one or more of the devices 110, 120, 130, 140, 150a ... 150n, and/or 170 of FIG. 1, the CPU 605 of FIG. 6, and/or any other suitable processor, unless otherwise specified.

It is also to be understood that the processing flow 500 can include one or more operations, actions, or functions as illustrated by one or more of blocks 510, 520, 530, 540, 550, and 560. These various operations, functions, or actions may, for example, correspond to software, firmware, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 500, operations including initializations or the like may be performed. For example, system parameters and/or application parameters may be initialized. It is to be understood that the processes, operations, or actions described in FIGS. 2-4 may be implemented or performed by the processor(s). Processing flow 500 may begin at block 510.

At block 510 (Prepare offloading command), a processor on a host device, e.g., 270 of FIG. 2 or 470 of FIG. 4, may be designed, programmed, or otherwise configured to optionally prepare a hardware offloading command, in which the hardware offloading command may include one or more of an operation code, an input pointer, an input size, an output pointer, an output size, and/or flags. For example, as discussed above, the host device may be designed, programmed, or otherwise configured to utilize a unified data pointer to identify a source of input data and/or a destination of output data, such that a single command may be used to represent all types of different data transfers/directions, e.g., different storage/memory locations for reading/writing data. In an embodiment, the host device may be designed, programmed, or otherwise configured to prepare the hardware offloading command entry for the input pointer field with the unified data pointer. For example, in an embodiment, the host device may receive a request to support big data analytics, such as, collecting, processing, scrubbing, and/or analyzing an input stream from a source location selected from, the memory on the host device, the memory on the hardware offloading engine, the storage device, a unified memory, or other location having input data for processing by the hardware acceleration module or for writing output data from the hardware acceleration module. The unified data pointer may be an amount, portion, or part of the memory address for the source location and/or destination location, and may include one or more bits of memory that includes a binary bit identifier, such as, a binary 2-bit entry, e.g., 00, 10, 11, etc., for identifying the source or destination location. As such, the host device may be configured to provide, send, and/or prepare the hardware offloading command entry for the hardware offloading engine to perform the hardware offloading operation, e.g., in command descriptor format, including fields, such as, hardware offloading operation type (e.g., opcode), input pointer, input size of the input data, output pointer, output size, and/or flags, in which the data describing and/or characterizing the request (and/or input data) is used in the corresponding fields for the hardware offloading command entry. It is appreciated that while the unified data pointer B is described herein as being a 2, 4, or 6-bit entry, such disclosure is not intended to be limiting. Rather, the size and/or use of the bit identifier, e.g., 2-bit identifier, used for the unified data pointer B may depend on the use and the number of source/destination locations, in which different types, sources, or locations of memory may be used for more complex situations, e.g., multiple data centers or server locations, one or more input (or output) data locations, or the like. That is, the size and/or amount of bits used for the unified data pointer B is not limited herein, but rather, provided as exemplary embodiments, in which the unified data pointer B may be determined by the number of memory locations to be used as the source locations and/or the destination locations. As such, additional or new complex commands are not necessary for each type of data transfer, but rather, the unified data pointer architecture may be used to simplify the data transfer commands between different memory locations, which may reduce software complexity and/or development effort for the software, e.g., by the programmers or developers. Processing may proceed from block 510 to block 520.

At block 520 (Receive the offloading command), a processor on a hardware offloading engine, e.g., 220 of FIG. 2 or 420 of FIG. 4, in the same data center or a second data center in communication with the data center, may be designed, programmed, or otherwise configured to receive and/or fetch the hardware offloading command from the host device, in which the hardware offloading command includes at least the operation code, the input pointer, the input size, and the output size. The hardware offloading engine may be in communication with the host device via an interface, e.g., 221, and/or the device driver, e.g., 273, of the host device. Processing may proceed from block 520 to block 530.

At block 530 (Parse the offloading command), the processor on the hardware offloading engine may be designed, programmed, or otherwise configured to parse the hardware offloading command, e.g., in command descriptor format, into the different fields for operation/execution thereon. For example, in some embodiments, the hardware offloading engine may parse the hardware offloading command entry to identify the operation code, the input pointer, the input size, the output pointer, and the output size. In some embodiments, when the input pointer and/or the output pointer is parsed, the input pointer may include the unified data pointer that identifies the source (or the destination) of the input data (or the output data) as well as the address for accessing the input data. For example, in some embodiments, the binary bit entry "00" may represent memory on the host device, e.g., 270 or 470, the bit entry "10" may represent memory on the hardware offloading engine, e.g., 220 or 420, and the bit entry "11" may represent the storage device address. As such, at block 530, the hardware offloading engine knows the operation, e.g., based on the opcode, to be unloaded on the hardware offloading engine as well as the source of the input data for processing. Processing may proceed from block 530 to block 540.

At block 540 (Retrieve input data), the processor on the hardware offloading engine may be designed, programmed, or otherwise configured to retrieve (or receive) input data based on the input pointer and the input size, e.g., from the specific memory location, e.g., memory on the host device, designated by the unified data pointer and address in the input pointer. In some embodiments, the hardware offloading engine may be designed, programmed, or otherwise configured to start retrieving/receiving the input data from the host device starting from the specified address at the input pointer and indicated input size of the hardware offloading command entry. In some embodiments, when the input data is stored in memory on the host device, the device driver of the host device may be designed, programmed, or otherwise configured to transmit (or retrieve) the input data based on the hardware offloading command entry. As such, processing may proceed from block 540 to block 550.

At block 550, (Execute offloading operation), the processor on the hardware offloading engine may be designed, programmed, or otherwise configured to execute the offloaded operation on the hardware offloading engine on the input data based on the operation code. That is, after the hardware offloading engine retrieves the input data, or starts retrieving the input data, from the host device, e.g., specified memory location, the hardware offloading engine may be designed, programmed, or otherwise configured to internally execute the offloading operation, e.g., based on the opcode, such as, select, project, or the like, on the input data streams. After the operation is performed on the input data stream, the hardware offloading engine may generate output data, which may be returned to the host device or written to the storage device. For example, in an embodiment, when the output pointer is parsed, the output pointer may include the unified data pointer to identify the destination of the output data, as well as the address for writing the output data. As such, the processor on the hardware offloading engine may be designed, programmed, or otherwise configured to write the output data based on the output pointer and the output size, e.g., starting from the specific memory location, e.g., memory on the host device, designated by the unified data pointer and address in the output pointer. As such, processing may proceed from block 550 to block 560.

At block 560, (Return completion status), the processor on the hardware offloading engine and/or the processor on the host device may be designed, programmed, or otherwise configured to optionally send a completion command, for example, when the offloaded operation includes a write operation for the output data on, e.g., the storage device or host device, after completion of the offloaded operation.

FIG. 6 is a schematic structural diagram of an example computer system 600 applicable to implementing an electronic device (for example, the server, host device, or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIG. 5 and/or the processes described in other figures may be implemented as computer software programs and/or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

Methods, systems, and devices are described herein directed to optimizing non-volatile storage systems that use hardware offloading or hardware acceleration by utilizing a unified data pointer in the offloading command for the hardware acceleration and/or hardware offloading operations. The unified data pointer may be used to point to the specific memory location(s) from where the data is sourced, e.g., read, or where the data needs to be stored, e.g., written. That is, the methods, systems, and devices are designed, programmed, or otherwise configured to prepare and/or parse an offloading command that includes a data field for using a unified data pointer to identify a source of input data and/or a destination of output data, such that a single command may be used to represent all types of different data transfers/directions, e.g., different storage/memory locations for reading/writing data. As such, additional or new complex commands are not necessary for each type of data transfer, but rather, the unified data pointer architecture may be used to simplify the data transfer commands between different memory locations, which may reduce software complexity and/or development effort for the software, e.g., by the programmers or developers.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A hardware offloading engine for performing an acceleration process, the hardware offloading engine comprising: a hardware accelerator for performing the acceleration process, the hardware accelerator having a processor configured to: receive a hardware offloading command, the hardware offloading command comprising an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location for the input data or the destination location of the output data, parse the operation code, the input pointer, and the output pointer from the hardware offloading command, retrieve the input data based on the input pointer, and execute an offloaded operation on the input data based on the operation code.

Aspect 2. The hardware offloading engine of Aspect 1, wherein the one or more bits of memory of the unified data pointer defines a host device memory, a hardware offloading engine memory, or a non-volatile storage device block to identify the source of the input data or the destination of the output data.

Aspect 3. The hardware offloading engine of any of Aspects 1-2, wherein the input pointer comprises the unified data pointer and the input pointer further comprises a memory address for the input data.

Aspect 4. The hardware offloading engine of Aspect 3, wherein the input pointer includes a memory address, and wherein the unified data pointer includes the one or more bits of memory that is a portion of the memory address to identify the source of the input data.

Aspect 5. The hardware offloading engine of Aspect 4, wherein an amount of the one or more bits of memory is determined by a number of source locations for the input data.

Aspect 6. The hardware offloading engine of Aspect 4, wherein the one or more bits of memory includes a binary 2-bit identifier, wherein the binary 2-bit identifier includes "00" to identify memory on a host device, "10" to identify memory on the hardware offloading engine, and "11" to identify a non-volatile storage device.

Aspect 7. The hardware offloading engine of any of Aspects 1-6 wherein the processor is further configured to write the output data of the offloaded operation based on the output pointer, wherein the output pointer comprises the unified data pointer for identifying the destination of the output data.

Aspect 8. The hardware offloading engine of Aspect 7, wherein the output pointer further comprises a memory address for the output data.

Aspect 9. The hardware offloading engine of Aspect 8, wherein the unified data pointer includes one or more bits of memory that is a portion of the memory address to identify the destination of the output data.

Aspect 10. The hardware offloading engine of Aspect 9, wherein an amount of the one or more bits of memory is determined by a number of destination locations for the output data.

Aspect 11. The hardware offloading engine of Aspect 9, wherein the one or more bits of memory includes a binary 2-bit identifier, wherein the binary 2-bit identifier includes "00" to identify memory on a host device, "10" to identify memory on the hardware offloading engine, and "11" to identify a non-volatile storage device.

Aspect 12. The hardware offloading engine of any of Aspects 1-11, wherein the hardware accelerator comprises one or more hardware accelerator modules for executing the offloaded operation such that the offloaded operation is offloaded from a host device.

Aspect 13. The hardware offloading engine of any of Aspects 1-12, wherein the hardware offloading command is received from a host device.

Aspect 14. The hardware offloading engine of any of Aspects 1-13, wherein the hardware offloading command further comprises an input data size and an output data size.

Aspect 13. A non-volatile storage device comprising: a non-volatile storage; and a controller comprising: a hardware offloading engine for performing an acceleration process, the hardware offloading engine comprising: a first interface for communicating with a host device; a second interface for communicating with the non-volatile storage; and a hardware accelerator for performing the acceleration process, the hardware accelerator having a processor configured to: receive a hardware offloading command, the hardware offloading command comprising an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location for the input data or the destination location of the output data, parse the operation code, the input pointer, the input data size, the output pointer, and the output data size from the hardware offloading command, retrieve input data based on the input pointer and the input data size, and execute an offloaded operation on the input data based on the operation code.

Aspect 14. A hardware offloading engine for performing an acceleration process, the hardware offloading engine comprising: a hardware accelerator for performing the acceleration process, the hardware accelerator having a processor configured to: receive a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data; and execute an offloaded operation on the input data based on the operation code.

Aspect 15. A method for performing an acceleration process by offloading an operation to a hardware offloading engine, the method comprising: receiving a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data, parsing the operation code, the input pointer, and the output pointer from the hardware offloading command, retrieving the input data based on the input pointer, and executing an offloaded operation on the hardware offloading engine on the input data based on the operation code.

Aspect 16. The method of Aspect 15, further comprising writing the output data of the offloaded operation from the hardware offloading engine based on the output pointer, wherein the output pointer includes the unified data pointer that includes the one or more bits of memory for identifying the destination of the output data.

Aspect 17. The method of Aspect 16, wherein the output pointer further comprises a memory address for the output data.

Aspect 18. The method of Aspect 17, wherein the unified data pointer includes the one or more bits of memory that is a portion of the memory address to identify the destination of the output data.

Aspect 19. The method of any of Aspects 15-18, wherein the retrieving the input data based on the input pointer includes the input pointer comprising the unified data pointer.

Aspect 20. The method of Aspect 19, wherein the input pointer includes a memory address, and wherein the unified data pointer includes the one or more bits of memory that is a portion of the memory address to identify the source of the input data.

Aspect 21. A host device configured to be in communication with a non-volatile storage device, the host device comprising: a non-transitory computer readable medium having computer-executable instructions stored thereon that, upon execution, cause one or more processors to perform operations comprising: preparing a hardware offloading command by providing an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location of the input data or the destination location of the output data, sending the hardware offloading command, and receiving a completion command.

Aspect 22. The host device of Aspect 21, wherein the one or more bits of memory of the unified data pointer defines a host device memory, a hardware offloading engine memory, or a non-volatile storage device block to identify the source location of the input data or the destination location of the output data.

Aspect 23. The host device of any of Aspects 21-22, wherein the input pointer comprises the unified data pointer to identify the source of the input data, and the input pointer further comprises an address for the input data.

Aspect 24. The host device of any one of Aspects 21-23, wherein the output pointer comprises the unified data pointer for identifying the destination of the output data, and the output pointer further comprises an address for the output data.

Aspect 25. A non-transitory computer-readable medium having computer-executable instructions stored thereon, which upon execution, cause one or more processors to perform operations including: receiving a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data, parsing the operation code, the input pointer, and the output pointer from the hardware offloading command, retrieving the input data based on the input pointer, and executing an offloaded operation on the hardware offloading engine on the input data based on the operation code.

Aspect 26. The non-transitory computer-readable medium of Aspect 25, wherein the one or more processors are further configured to perform operations including: having computer-executable instructions stored thereon, which upon execution, cause one or more processors to perform operations including writing the output data of the offloaded operation from the hardware offloading engine based on the output pointer, wherein the output pointer includes the unified data pointer that includes the one or more bits of memory for identifying the destination of the output data.

Aspect 27. The non-transitory computer-readable medium of any of Aspects 25-26, wherein the output pointer further comprises a memory address for the output data.

Aspect 28. The non-transitory computer-readable medium of any of Aspects 25-27, wherein the retrieving the input data based on the input pointer includes the input pointer comprising the unified data pointer.

Aspect 29. The non-transitory computer-readable medium of Aspect 28, wherein the input pointer includes a memory address, and wherein the unified data pointer includes the one or more bits of memory that is a portion of the memory address to identify the source of the input data.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A hardware offloading engine for performing an acceleration process, the hardware offloading engine comprising:
    a hardware accelerator for performing the acceleration process, the hardware accelerator having a processor configured to:
    receive a hardware offloading command, the hardware offloading command comprising an operation code, an input pointer for identifying a source location for input data for the hardware accelerator, and an output pointer for identifying a destination location of output data from the hardware accelerator, wherein at least one of the input pointer or the output pointer includes a unified data pointer that includes one or more bits of memory for identifying the source location for the input data or the destination location of the output data,
    parse the operation code, the input pointer, and the output pointer from the hardware offloading command,
    retrieve the input data based on the input pointer, and
    execute an offloaded operation on the input data based on the operation code.

2. The hardware offloading engine of claim 1, wherein the one or more bits of memory of the unified data pointer defines a host device memory, a hardware offloading engine memory, or a non-volatile storage device block to identify the source location of the input data or the destination location of the output data.

3. The hardware offloading engine of claim 1, wherein the input pointer comprises the unified data pointer and the input pointer further comprises a memory address for the input data.

4. The hardware offloading engine of claim 3, wherein the unified data pointer includes the one or more bits of memory that is a portion of the memory address to identify the source location of the input data.

5. The hardware offloading engine of claim 4, wherein an amount of the one or more bits of memory is determined by a number of source locations for the input data.

6. The hardware offloading engine of claim 4, wherein the one or more bits of memory includes a binary 2-bit identifier, wherein the binary 2-bit identifier includes "00" to identify memory on a host device, "10" to identify memory on the hardware offloading engine, and "11" to identify a non-volatile storage device.

7. The hardware offloading engine of claim 1, wherein the processor is further configured to write the output data of the offloaded operation based on the output pointer, wherein the output pointer comprises the unified data pointer for identifying the destination location of the output data.

8. The hardware offloading engine of claim 7, wherein the output pointer further comprises a memory address for the output data.

9. The hardware offloading engine of claim 8, wherein the unified data pointer includes one or more bits of memory that is a portion of the memory address to identify the destination location of the output data.

10. The hardware offloading engine of claim 9, wherein an amount of the one or more bits of memory is determined by a number of destination locations for the output data.

11. The hardware offloading engine of claim 9, wherein the one or more bits of memory includes a binary 2-bit identifier, wherein the binary 2-bit identifier includes "00" to identify memory on a host device, "10" to identify memory on the hardware offloading engine, and "11" to identify a non-volatile storage device.

12. The hardware offloading engine of claim 1, wherein the hardware accelerator comprises one or more hardware accelerator modules for executing the offloaded operation such that the offloaded operation is offloaded from a host device.

13. A method for performing an acceleration process by offloading an operation to a hardware offloading engine, the method comprising:
receiving a hardware offloading command, the hardware offloading command comprising an operation code, an input pointer for identifying a source location for input data, and an output pointer for identifying a destination location of output data, wherein at least one of the input pointer or the output pointer includes a unified data pointer that includes one or more bits of memory for identifying the source location for the input data or the destination location of the output data,
parsing the operation code, the input pointer, and the output pointer from the hardware offloading command,
retrieving the input data based on the input pointer, and
executing an offloaded operation on the hardware offloading engine on the input data based on the operation code.

14. The method of claim 13, further comprising writing the output data of the offloaded operation from the hardware offloading engine based on the output pointer, wherein the output pointer includes the unified data pointer that includes the one or more bits of memory for identifying the destination location of the output data.

15. The method of claim 14, wherein the output pointer further comprises a memory address for the output data.

16. The method of claim 15, wherein the unified data pointer includes the one or more bits of memory that is a portion of the memory address to identify the destination location of the output data.

17. The method of claim 13, wherein the retrieving the input data based on the input pointer includes the input pointer comprising the unified data pointer.

18. The method of claim 17, wherein the input pointer includes a memory address, and wherein the unified data pointer includes the one or more bits of memory that is a portion of the memory address to identify the source location of the input data.

* * * * *